US007746820B2

(12) United States Patent
Buehler et al.

(10) Patent No.: US 7,746,820 B2
(45) Date of Patent: Jun. 29, 2010

(54) RESPONSE SYSTEM AND METHOD WITH DYNAMIC PERSONALITY ASSIGNMENT

(75) Inventors: William S. Buehler, Zeeland, MI (US);
Harry G. Derks, Holland, MI (US);
Michael B. Hall, Holland, MI (US);
Troy A. Redder, Grand Haven, MI (US);
David L. Ramon, Holland, MI (US);
Michael S. Glass, Conklin, MI (US)

(73) Assignee: Fleetwood Group, Inc., Holland, MI (US)

( * ) Notice: Subject to any disclaimer, the term of this patent is extended or adjusted under 35 U.S.C. 154(b) by 767 days.

(21) Appl. No.: 11/163,008

(22) Filed: Sep. 30, 2005

(65) Prior Publication Data

US 2006/0072497 A1 Apr. 6, 2006

Related U.S. Application Data

(60) Provisional application No. 60/635,339, filed on Dec. 10, 2004, provisional application No. 60/615,673, filed on Oct. 4, 2004.

(51) Int. Cl.
*H04W 4/00* (2009.01)
*H04B 7/212* (2006.01)
*G06F 15/167* (2006.01)
*G09B 3/00* (2006.01)
*H04N 7/173* (2006.01)

(52) U.S. Cl. .................... 370/328; 370/442; 709/218; 434/351; 725/24

(58) Field of Classification Search ............... 370/328, 370/442; 709/218; 434/351; 725/24
See application file for complete search history.

(56) References Cited

U.S. PATENT DOCUMENTS

| 5,379,213 A | 1/1995 | Derks |
| 5,553,074 A * | 9/1996 | Acampora ............ 370/349 |
| RE35,449 E | 2/1997 | Derks |

(Continued)

FOREIGN PATENT DOCUMENTS

WO WO 95/34963 12/1995

OTHER PUBLICATIONS

International Search Report from corresponding Patent Cooperation Treaty Application No. PCT/US05/35354, dated Mar. 15, 2007.

*Primary Examiner*—Vincent P Harper
*Assistant Examiner*—Ariel Balaoing
(74) *Attorney, Agent, or Firm*—Van Dyke, Gardner, Linn & Burkhart, LLP (57) ABSTRACT

A response system and method of retrieving user responses from a plurality of users includes providing a plurality of base units and a plurality of response units, each of the response units adapted to receive a user input selection and to communicate that user input selection with at least one base unit utilizing wireless communication. Personality data is provided for the response units. The personality data facilitates communication with a particular base unit. The personality data of a particular one of the response units is changed in order to change which of the base units that response unit communicates. This allows a response unit to become grouped with a particular base unit at a particular time and become grouped with another base unit at another particular time. The personality data may be obtained from a database.

35 Claims, 8 Drawing Sheets

U.S. PATENT DOCUMENTS

| | | |
|---|---|---|
| 5,724,357 A | 3/1998 | Derks |
| 6,021,119 A | 2/2000 | Derks et al. |
| 6,070,084 A | 5/2000 | Hamabe |
| 6,289,222 B1 | 9/2001 | Cue et al. |
| 6,477,154 B1 | 11/2002 | Cheong et al. |
| 6,591,103 B1 * | 7/2003 | Dunn et al. .................. 455/436 |
| 6,665,000 B1 | 12/2003 | Buehler et al. |
| 6,711,408 B1 * | 3/2004 | Raith ........................... 455/440 |
| 6,895,213 B1 | 5/2005 | Ward |
| 2002/0071449 A1 * | 6/2002 | Ho et al. ...................... 370/447 |
| 2002/0143415 A1 | 10/2002 | Buehler et al. |
| 2002/0176381 A1 | 11/2002 | Hammel et al. |
| 2003/0153263 A1 | 8/2003 | Glass et al. |
| 2003/0153321 A1 | 8/2003 | Glass et al. |
| 2003/0153347 A1 | 8/2003 | Glass et al. |
| 2003/0215780 A1 * | 11/2003 | Saar et al. .................... 434/351 |
| 2003/0222544 A1 | 12/2003 | Kelley et al. |
| 2003/0236891 A1 * | 12/2003 | Glass et al. .................. 709/227 |
| 2004/0033478 A1 * | 2/2004 | Knowles et al. ............. 434/350 |
| 2004/0042600 A1 | 3/2004 | Tripathi et al. |
| 2004/0229642 A1 | 11/2004 | Derks et al. |
| 2005/0114537 A1 * | 5/2005 | Griswold et al. ............ 709/231 |
| 2005/0227722 A1 * | 10/2005 | Harris et al. ................. 455/518 |

* cited by examiner

RESPONSE SYSTEM AND METHOD WITH DYNAMIC PERSONALITY ASSIGNMENT

CROSS REFERENCE TO RELATED APPLICATION

This application claims priority from U.S. provisional patent application Ser. No. 60/635,339, filed on Dec. 10, 2004, and U.S. provisional patent application Ser. No. 60/615,673, filed on Oct. 4, 2004, the disclosures of which are hereby incorporated herein by reference in their entireties.

BACKGROUND OF THE INVENTION

The present invention is directed to response systems for retrieving responses entered by users with a keypad, known as a response unit. The invention is particularly useful with wireless response systems, such as systems utilizing radio frequency communication, infrared communication, and the like.

Wireless response systems are typically used in a single room or adjacent rooms in which response units, or keypads, are handed out to individual users and the serial numbers of the response units logged to the individual user, if that information is desired. The response units each include personality data that allows the response units to communicate with the base unit or a plurality of coordinated base units. The personality data may include a timeslot in which the response unit is set to transmit response data following receipt of a base packet transmission. Alternatively, it may include a communication address assigned to the response unit. In such a system, the response units and base unit(s) are set to communicate on a common frequency or channel, or, in the case of spread spectrum communication, according to a common frequency hopping sequence. It is possible to adjust the frequency channel or hopping sequence utilizing actuation of a unique combination of keys on the response units and base unit or utilizing application software running on a computer connected with the base unit.

While such unit may be suitable even for extremely large groups of up to thousands of users, there are additional requirements in a university setting or in a large corporate setting. In particular, in such a setting, it may be desired to provide a response unit, or keypad, to each participant, such as a student or employee. The student or employee may retain that response unit for an extended period of time and utilize it in different settings within the university or corporation. However, difficulties arise in allowing the response unit to be used with multiple different base units as the student or employee moves from room-to-room during different times of the day and different days of the week.

SUMMARY OF THE INVENTION

The present invention provides a response system and method that allows response units to communicate with a particular base unit, or base units, at a particular time and to communicate with another base unit, or base units, at another particular time, and thereby facilitates migration of users from base unit to base unit.

A response system and method of retrieving user responses from a plurality of users, according to an aspect of the invention, includes providing a plurality of base units and a plurality of response units. Each of the response units is adapted to receive a user input selection and to communicate that user input selection with at least one of said base units utilizing wireless communication. Personality data is provided for the response units. The personality data facilitates communication with a particular base unit. The personality data of a particular one of the response units is changed in order to change which of the base units that particular one of the response units communicates.

A response system and method retrieving user responses from a plurality of users, according to another aspect of the invention, includes providing a plurality of base units and a plurality of response units. Each of the response units is adapted to receiving a user input selection and to communicate the user input selection with the at least one base unit utilizing wireless communication. At least one of the base units communicates with the response units utilizing a standard protocol in order to retrieve user input selections from response units joined with that base unit. The at least one base unit communicates with the response unit utilizing a JOIN protocol in order to join response units with that base unit. The protocols may be combined in a common transmission.

A response system and method of retrieving user responses from a plurality of users includes providing a plurality of base units and a plurality of response units. Each of the response units is adapted to receive a user input selection and to communicate that user input selection with at least one of said base units utilizing wireless communication. The transmission power level of the at least one of said base units is adapted to be adjusted as a function of a parameter of a space in which that base unit is utilized to reduce interference with other base units.

A response system and method of retrieving user responses from a plurality of users, according to another aspect of the invention, includes providing a plurality of base units and a plurality of response units. Each of the response units is adapted to receive a user input selection and to communicate that user input selection with at least one of the base units utilizing wireless communication. A database is provided that correlates base units with users and/or response units at particular times. A response unit becomes grouped with at least one of the base units at a particular time and becomes grouped with at least one other of the base units at another particular time at least partially as a function of data in the database.

In any of the response systems and methods of retrieving user responses set forth above, the personality data may be changed in response to a message sent from that response unit or to that particular response unit. A database may be provided that relates base units with response units and/or users at particular times. The database may reside at either a host computer system communicating with the base units, a computer connected with an individual one of the base units, or each of the response units.

In any of the above, personality data may be changed at the response units from either one of the base units, a proximity transmitter adapted to communicate with one of the response units at close proximity, a wide area transmitter adapted to transmit to more than one of the response units or an identity card associated with the respective one of the response units. The personality data may include an address, a communications timeslot, a spread spectrum setting, a base unit association, a serial number, the ability to communicate with the particular base unit, or the ability to communicate with more than one base unit or settings relating to mode of operation, such as professor preferences. The personality data may be changed at a particular response unit in response to at least one event, including the response unit being powered up, the response unit detecting a transmitted command, a user entering a JOIN command at the particular one of the response units, an identity card being plugged into or scanned with the particular one of the response units, an analysis of a class schedule, or acceptance of a default setting.

In any of the above, the response units may be adapted to communicate a user input selection with at least one of the base units synchronously in response to a polling signal from the at least one of the base units. Alternatively, the response unit may be adapted to communicate a user input selection with at least one of the base units asynchronously. The at least one of the base units and response units may communicate time-division multiplex communications, or the like. The at least one base unit may communicate with the standard protocol and the joined protocol according to a particular proportion, with the proportion changing with the time. The protocols may be combined.

These and other objects, advantages and features of this invention will become apparent upon review of the following specification in conjunction with the drawings.

DESCRIPTION OF THE PREFERRED EMBODIMENT

Figure 1:
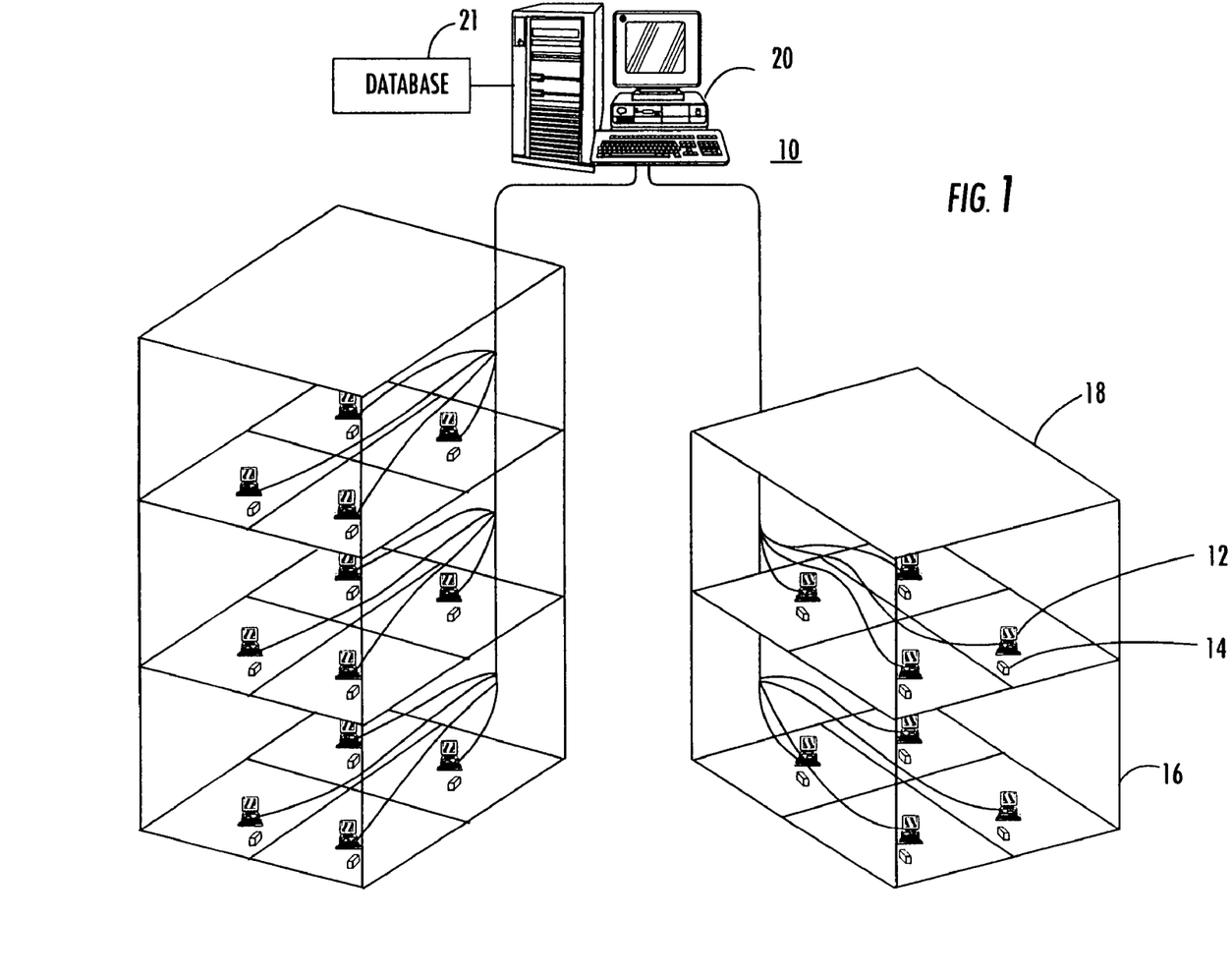
FIG. 1 is a perspective view of a response system according to an aspect of the invention.

Referring now specifically to the drawings, and the illustrative embodiments depicted therein, a response system 10 includes a plurality of base units 12 and a plurality of response units 14, each of which is provided to a user (FIG. 1). Base units 12 are generally adapted to be positioned in a room 16, such as a classroom, of a building 18, such as a campus building, or the like. The base unit may be connected with a personal computer, as illustrated in FIG. 1, or may be programmed to operate directly from a network. While only one response unit 14 is illustrated with each room, it should be understood that many response units may be present at any room 16 at a given time and may be carried from room-to-room as the user travels from class-to-class. While the invention is illustrated in a classroom setting, such as at a university, it may also be applied to corporate settings or other applications as would be apparent to the skilled artisan. In the illustrative embodiment, base units 12 and response units 14 may be provided according to the principles set forth in commonly assigned U.S. Pat. Nos. Re. 35,449; 5,724,357; 6,021,119; and 6,665,000; and U.S. Published Patent Application Nos. 2003/0153347 A1; 2003/0153321 A1; 2003/0153263 A1; 2003/0236891 A1; and 2004/0229642 A1; and U.S. provisional patent application Ser. No. 60/595,923 filed Aug. 18, 2005, by Derks and entitled ASYNCHRONOUS RESPONSE SYSTEM WITH ACKNOWLEDGE, the disclosures of which are hereby collectively incorporated herein by reference in their entireties. Communication between base units 12 and response units 14 may be synchronous under the control of the respective base unit or asynchronous in which the transfer of user responses from the response unit to the base unit is initiated by the respective response unit. Response system 10 may include a host computer system 20 interconnecting base units 12 in an enterprise network, as illustrated in FIG. 1. However, it should be understood that the invention may be carried out with base units 12 operating in a standalone fashion or with data being manually entered in the respective base unit as supplied from a central source. Standalone base units would typically be connected with a personal computer for running related software applications, as is conventional. Other variations will be apparent upon further details being set forth below.

In an educational environment, particularly in a university setting, or the like, a student is provided a response unit 14 at the beginning of the year, such as by purchasing at a bookstore, or when enrolling at the institution, the response unit being kept with the student for use in multiple ones of the student's classes. Thus, as a student changes classrooms, the student takes his/her response unit with him/her. The base units 12 may be generally stationary with one or more coordinated base units provided per classroom or may be carried into the classroom with the instructor. A difficulty arises with the ability of any of the response units 14 being able to communicate with the base unit 12 in which the student is presently located. This results from the necessity for the base unit to efficiently communicate with a subset of response units 14 at any particular time. Such communication, by way of example, may be utilizing time-division multiplexing (TDM) in which each response unit sends a response in an assigned timeslot following a base packet sent by the response unit. Alternatively, base unit 12 may send out communication addresses for response units with each response unit sending its response data in response to receipt of its address. Alternatively, response units 14 may send a response packet upon the user entering a response with the response packet including the response entered by the user and a serial number of the response unit sending the response data. Other communication techniques that are variations of the above-mentioned techniques may also be utilized.

Also, in order to have successful communication between a response unit and a particular base unit, they must both be communicating on a common frequency or channel with most systems allowing for multiple communication channels. Alternatively, a spread spectrum communication protocol, such as a frequency hop sequence or direct sequence spread spectrum, may be utilized in which the base unit and the response unit must utilize a common spread spectrum setting in order to communicate. While various modes of communication are possible between response unit 14 and base unit 12, in the illustrative embodiment, radio frequency (RF) wireless communication is utilized. An advantage of RF communication is that it is robust and capable of high-speed data communication. One disadvantage is that it is possible for a response unit in one room 16 to communicate with a base unit 12 in an adjacent room or in a room in an adjacent building 18. Other forms of wireless communication are possible, such as infrared (IR), or the like.

Figure 2:
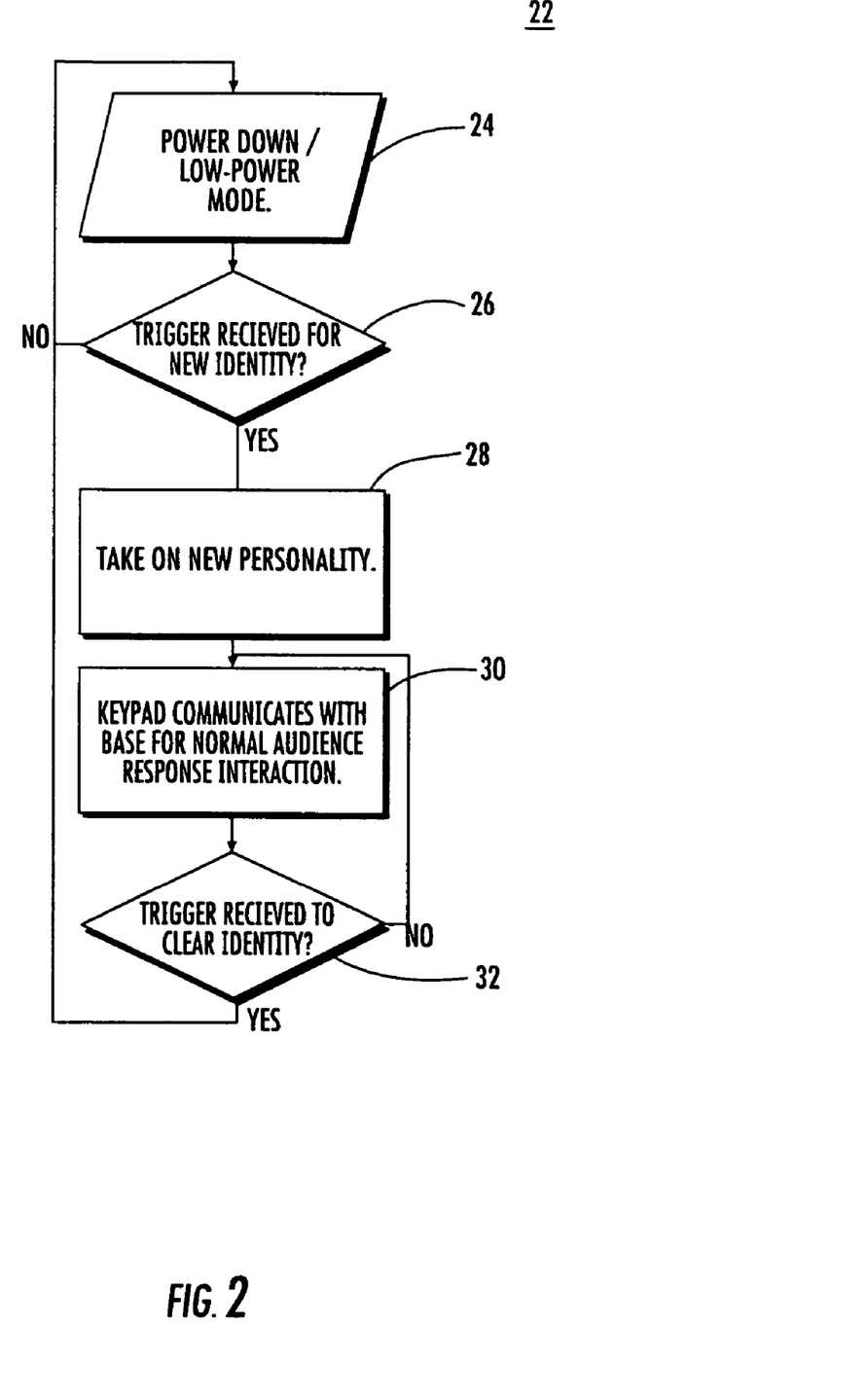
FIG. 2 is a block diagram of a method for dynamically assigning personality data according to the invention.

In order to facilitate communication between a response unit 14, brought into a room 16, and the base unit(s) in that room, a dynamic personality data processing process 22 is carried out in order to set or change personality data for that response unit (FIG. 2). Process 22 begins with the response unit 14 in a powered down or low-powered mode 24. It is determined at 26 whether the response unit received a trigger for obtaining new personality data. If it did receive a trigger, the response unit obtains new personality data at 28. If not, the base unit remains in the power-down/low-power mode (24) awaiting a trigger. Once the response unit takes on a new personality (28), the response unit is capable of communicating with a base unit at 30 for normal audience response interaction. Usually, the response unit will then be in communication with the base unit in the room in which the response unit has entered. The response unit awaits a trigger at 32 to clear the new personality data that was entered at 28. The trigger to clear identity may be exiting the room by the user, powering down of the response unit a command from the base unit, or the like.

Various triggers may be utilized to cause new personality data to be provided to a response unit, as will be described in more detail below. Examples of such triggers include, by way of example, the user powering on the response unit or pressing a "JOIN" key, or the like. Alternatively, the response unit may detect a transmitted command from the base unit or from another device adapted to dynamically changing the personality data of the response unit. Examples of other types of devices may be a proximity transceiver located in a doorway through which the student passes to enter the room, a proximity transmitter at the desk at which the student sits, or a wide area transmitter that transmits personality data to all response units campus-wide on a common frequency different from that used by the base unit. Alternatively, the trigger may be an identity card plugged into or scanned by the response unit with the identity card containing the new personality data. Alternatively, a database 21 may be provided of student schedules in the room in which a student is scheduled to take a class at a particular time with the ability to access the database. The database may list users, serial numbers of response units associated with the users, class schedules of the users and relevant personality data for each class. The term database is intended to include data that can be derived by an algorithm, such as from a serial number of the response unit. In such situation, the serial number would be constructed to allow such data to be extracted. Alternatively, the response unit may be triggered to be directed to a default assignment according to internal logic of the response unit.

The personality data may be a particular communication address dynamically assigned to the response unit. This is particularly useful for retrieving of response data according to an address of the response unit. Alternatively, the personality data may include a timeslot assignment or other timing reference for use by the response unit in responding to a base packet sent by the base unit, such as in a time-division-multiplexing (TDM) protocol. The personality data may include a channel set to a particular frequency to communicate with the base unit or a base association value. The base association value is particularly useful in spread spectrum communication, particularly for frequency hopping spread spectrum communication. The personality data may be a new serial number of the response unit to replace the serial number that is assigned to the response unit at the time of manufacture. The personality data may additionally be data that allows the response unit to communicate with an individual base unit in the particular room, with multiple base units in an enterprise-wide control structure or with multiple base units, regardless of the control structure. The above are examples of personality data. Other examples will be apparent to the skilled artisan.

Figure 3:
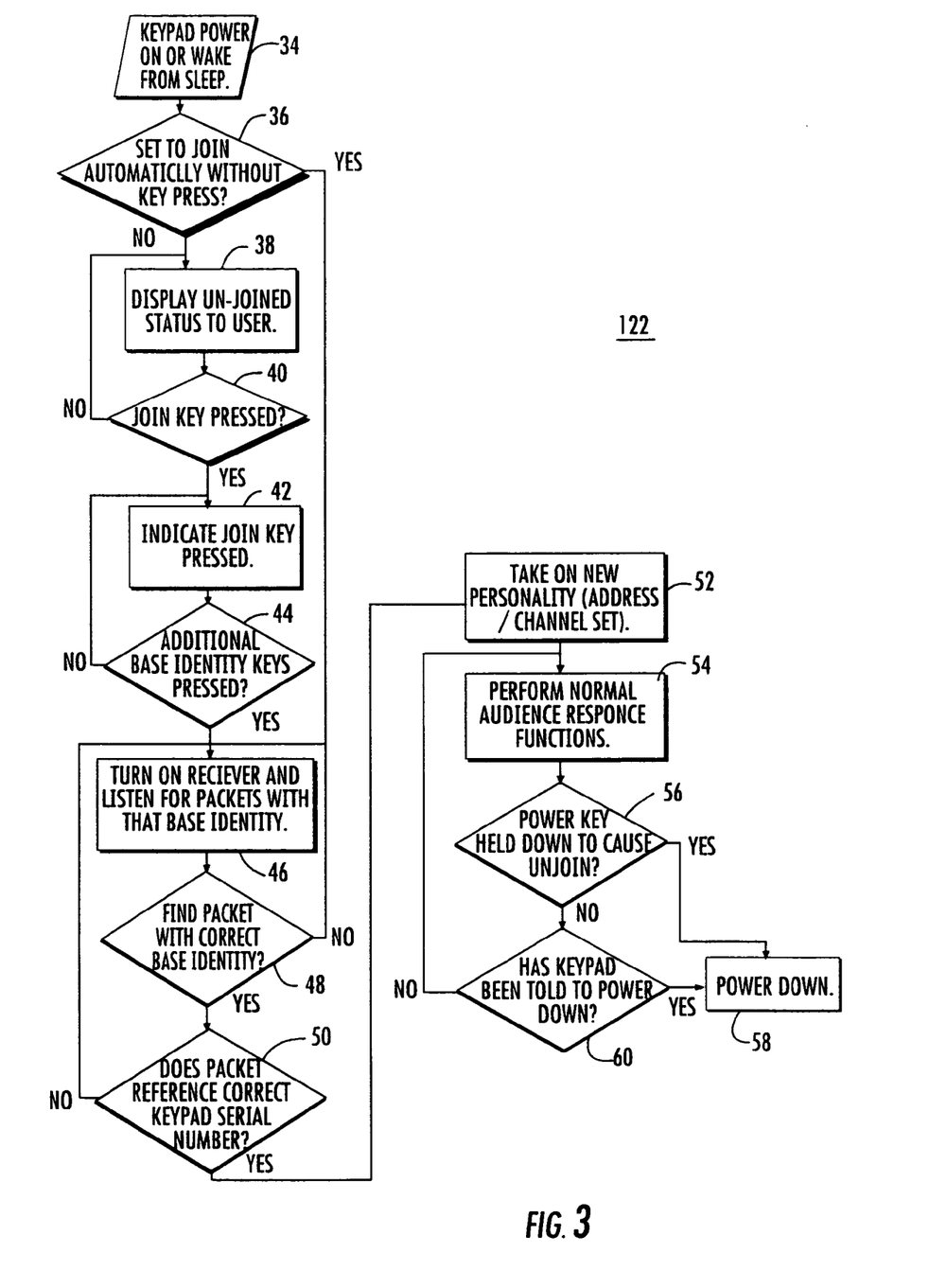
FIG. 3 is a block diagram of a method of dynamically assigning personality data with user entry of information identifying the base unit.

A detailed example of a dynamic personality data assignment process 122 is illustrated in FIG. 3. Process 122 begins with the response unit being powered up or woken from a sleep mode at 34. It is then determined at 36 whether the response system is set to allow a response unit to join a particular base unit, by receiving new personality data, without the necessity of pressing a "JOIN" key. A response unit is joined to a base unit if personality data is assigned to that response unit that facilitates communication with the particular base unit. If the response system is not set to join response units without a keypress, then an un-JOIN status is displayed to the user, such as by an audio signal, a display, or the like. The response unit then awaits actuation of a JOIN key at 40. When the JOIN key is pressed, an indication is made of this event at 42, such as by an audio or visual signal, or the like. If a JOIN key is not pressed at 40, the system returns to 38 to await the pressing of a JOIN key.

After the JOIN key is pressed at 42, the response unit control awaits entry of a base identity (ID) at 44. The base ID is a number assigned to the base unit in the particular room in which the student has entered. The base ID may be provided to the student, such as by a sign in the room, or the like. The base ID may be a frequency channel to which the particular base unit is set, may be a particular spread spectrum frequency hopping assignment, or the like. After the base ID is entered at 44, the response unit activates its receiver and awaits reception of data packets from the base unit having the entered base ID at 46. When a base packet is received at 48 from the base unit having the correct ID, it is determined at 50 whether the base packet contains a reference to a response unit serial number that is assigned to that response unit.

The response unit includes a serial number that is assigned at manufacture. Until a response unit is joined with a particular base unit, the base unit may send out a series of serial numbers of response units that are scheduled to be in that classroom at that particular time. Alternatively, the response unit may send out a request to be joined to a base unit. As will be explained in more detail below, the base unit may be apprised of the serial numbers of the response units that are to be in that particular room at that particular time from a database constructed from student schedules. As will be discussed in more detail below, the base unit sends out base packets according to either an audience response protocol or a keypad joining protocol or a combination of both, the latter being for the purpose of joining a response unit to the base unit by assigning dynamic personality data to the response unit. The keypad "JOIN" protocol includes the serial number of the response unit, typically as set by manufacture and the dynamic personality data that is to be assigned to the response unit having that serial number. When the response unit identifies its serial number in a base packet according to the keypad joining protocol, the response unit takes on the new personality data associated with that serial number at 52. A timeout function may be provided so that the response unit does not leave its receiver on indefinitely if its serial number is not received. Once the response unit is assigned personality data which facilitates communication with a particular base unit, the base unit and response unit perform normal audience response functions 54 in the manner known in the art. The normal audience response function continues until the user powers down the response unit at 56 or otherwise initiates an un-JOIN function typically at the end of the particular class. The unit is then powered down at 58. It should be understood that powering down may include switching to a low energy consumption sleep mode. If the keypad is not un-JOINED at 56, it awaits being instructed to power down at 60 and powers down at 58 if instructed to do so.

If the response system is set to join response units to base units without the necessity for pressing a JOIN key at 36, the response unit attempts to receive a base packet at 48. This may be accomplished by assigning a common channel or base ID or common spread spectrum hop sequence for any response units to communicate with any base unit. The response unit attempts to receive base packets from any base unit on the universal or global base ID. When the response unit receives a base packet with its serial number, even if transmitted from a base unit not in the room in which the response unit is located, the response unit takes on the new personality data associated with that serial number at 52 and performs normal audience response functions at 54.

Thus, it is seen that the base unit is capable of sending out different types of base packets. One type of base packet is an audience response protocol, such as a standard polling packet in order to coordinate time-division-multiplexing communication with the response unit joined to that base unit. Another type of base packet is according to a keypad joining protocol, namely, joining packets. Alternatively, these two types of packets may be implemented in a single packet with certain bits set to indicate the nature of the packet. The base unit may send the joining packet during timeslots that are at the end of a normal time-division multiplex response sequence. In such set of timeslots, the base unit sends out a sequence of response unit serial numbers and corresponding personality data for a number of response units. The joining packets for a particular number of response units may be sent in one interval following the standard polling packet and joining packets for other response units may be sent following another polling packet interval, or the like. The interval for sending joining packets may be dynamically adjusted, such that, for example, at the beginning of a class, all of the joining packets for all of the response units may be sent out. The base unit may discontinue sending a joining packet for a particular response unit when responses are received from that unit or the unit otherwise acknowledges its new personality data. As additional response units join that base unit, the interval dedicated to joining packets may be decreased thereby allowing more time for operation of the audience response protocol. Typically, the base unit would retain a certain interval for polling packets at all times so that even late arrivals can join the base unit.

Figure 4:
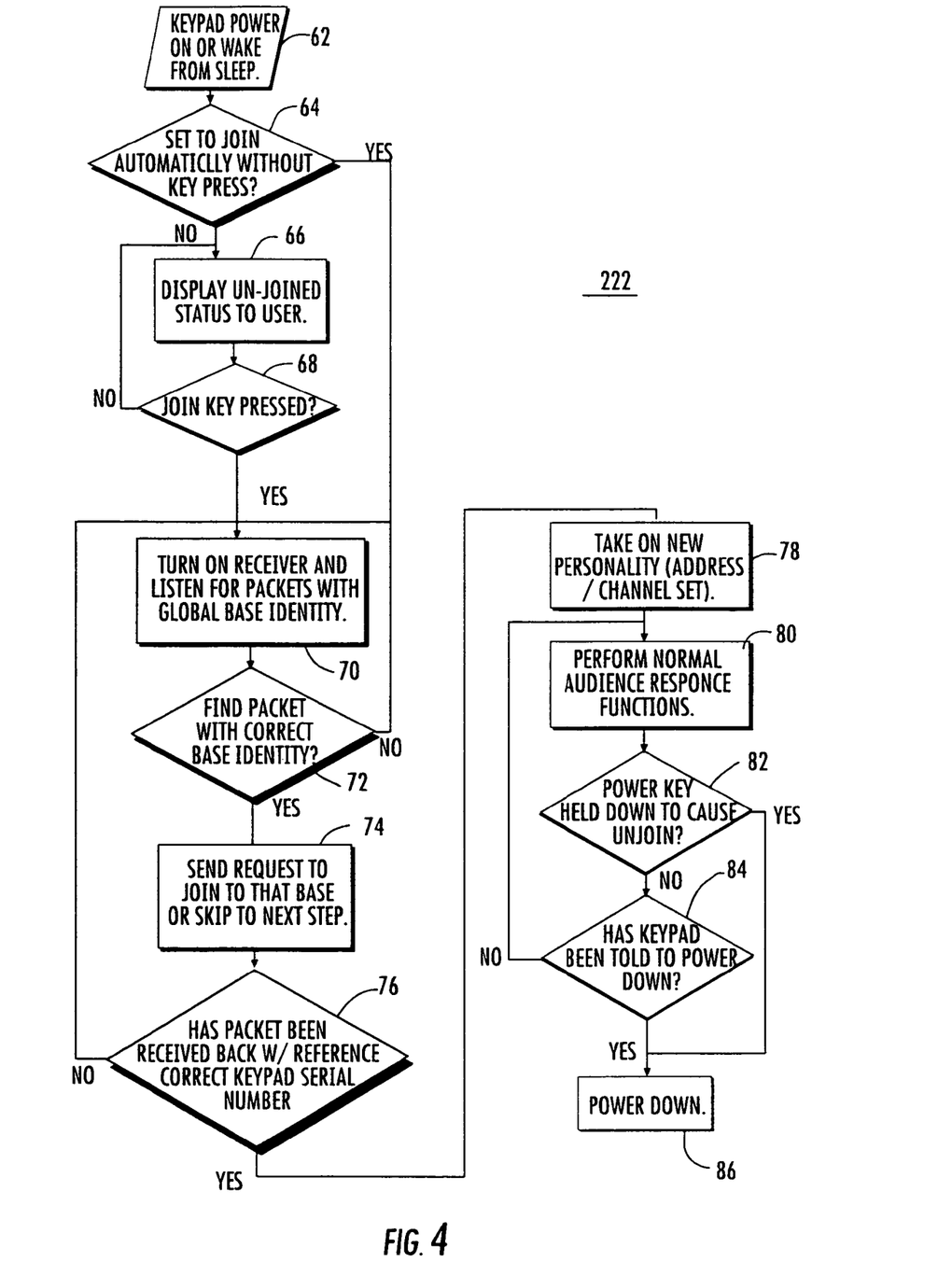
FIG. 4 is a block diagram of an automated method of dynamically assigning personality data.

In an alternative dynamic personality data assignment process 222, a response unit may be joined with a base unit without a keypress by the user (FIG. 4). Process 222 begins at 62 with the response unit powering on or waking up from a sleep state. The response unit control determines whether the response system is set to provide joining of response units without a keypress at 64. If it is not in this mode, an indicator, such as an audio indicator or a visual indicator, displays at 66 the un-JOINED status of the response unit and determines at 68 whether a JOIN key is pressed. If it is determined at 68 that the response system is set in a mode to allow response units to join automatically without a keypress, the response unit turns on its receiver at 70 and attempts to receive any base packets sent with a global base identity. A global base identity is one that is used for communication between that response unit and any base unit or subset of base unit. If a base packet is received at 72 with a correct base identity, a JOIN packet is transmitted at 74 from the response unit with a JOIN message with a request to join that base unit. The response unit then determines at 76 whether a base packet has been received back from a base unit with the serial number assigned to that response unit. If such a base packet has been received, the response unit takes on the new personality included with that base packet at 78 and switches to a mode at 80 in which the response unit performs a normal audience response function in association with one or more base units, with which the response unit is now joined, utilizing a conventional response technique known in the art. The response unit then awaits a power key being held down at 82 to power down the unit and causes the unit to un-JOIN the base unit(s) or determines at 84 whether the response unit has otherwise been told to power down. The response unit is then un-JOINED and powers down at 86. Alternatively, the response unit may un-JOIN one base unit as part of a process of joining another base unit without powering down.

In process 222, the base unit may be informed of the serial number and associated new personality from a single computer that is interconnected with that base unit, the computer having been provided with a database of student schedules and relationships to serial numbers and personality data. Alternatively, the base unit may obtain the serial number database from a host computer system 20, as illustrated in FIG. 1. Because the response unit transmits a JOIN packet on a global base unit ID, any base unit that is within reception range that has been configured to use a global ID could receive the JOIN packet. The receiving base unit passes the serial number of that response unit on to an enterprise server, such as host computer 22, to request the correct base unit ID and other personality data for that response unit for that day and hour. The base unit would transmit the personality data to the response unit.

Figure 5:
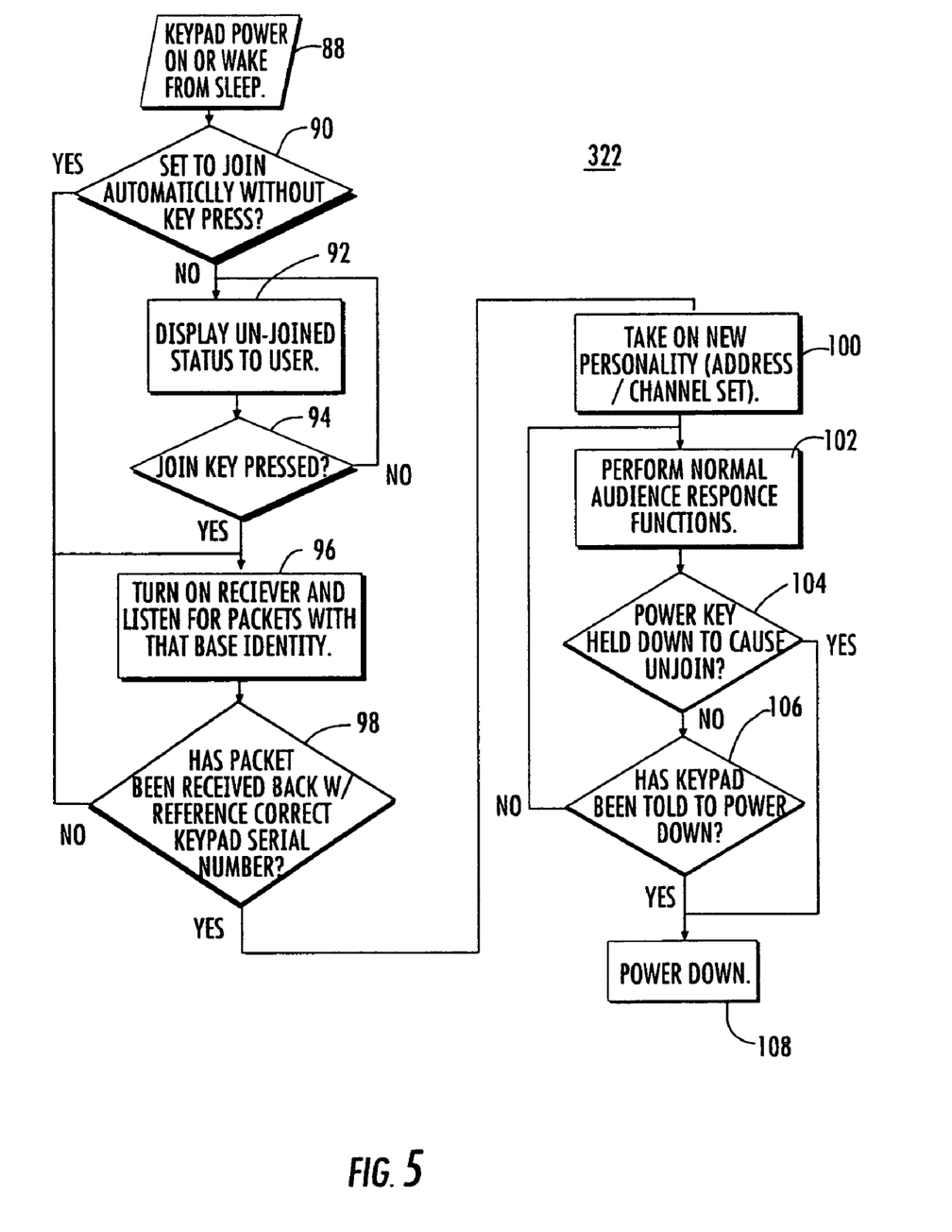
FIG. 5 is a block diagram of a method of dynamically assigning personality data using a common communication channel.

In a dynamic personality data assignment process 322, response units obtain personality data transmitted on a common channel, such as a wide area transmitter that may be separate from the base units (FIG. 5). In process 322, the response unit awakes at 88 and determines at 90 whether the response system is set to a mode that provides joining of keypads automatically without a keypress. If not, the response unit displays at 92 the un-JOINED status of the response unit and awaits pressing of a JOIN key at 94. If it is determined at 90 that the response system is set to join the response units automatically without a keypress, the receiver for that response unit is turned on at 96 to receive base packets from any base unit transmitting on a global base identity channel, or hop sequence in the case of a spread spectrum transmission. The response unit then determines at 98 whether the base packet has been received with a serial number that corresponds with that response unit and, if so, takes on the new personality data contained in the base transmission at 100. The response unit then enters into a mode in which it performs normal audience response functions at 102. The response unit awaits actuation of a power key being held down to cause the response unit to power down or, otherwise, awaits at 106 a message for the response unit to power down. The response unit is then powered down at 108.

In dynamic personality data assignment process 322, the base unit may obtain the serial number and associated new personality data from a single computer connected with that response unit programmed with a student schedule database. Alternatively, the base unit may be interconnected with a host computer 20. The wide area transmitter may be a high power transmitter that continuously transmits at high speed the serial number and personality data to every response unit within range. The transmitter may cover the entire enterprise, such as the university campus.

Figure 6:
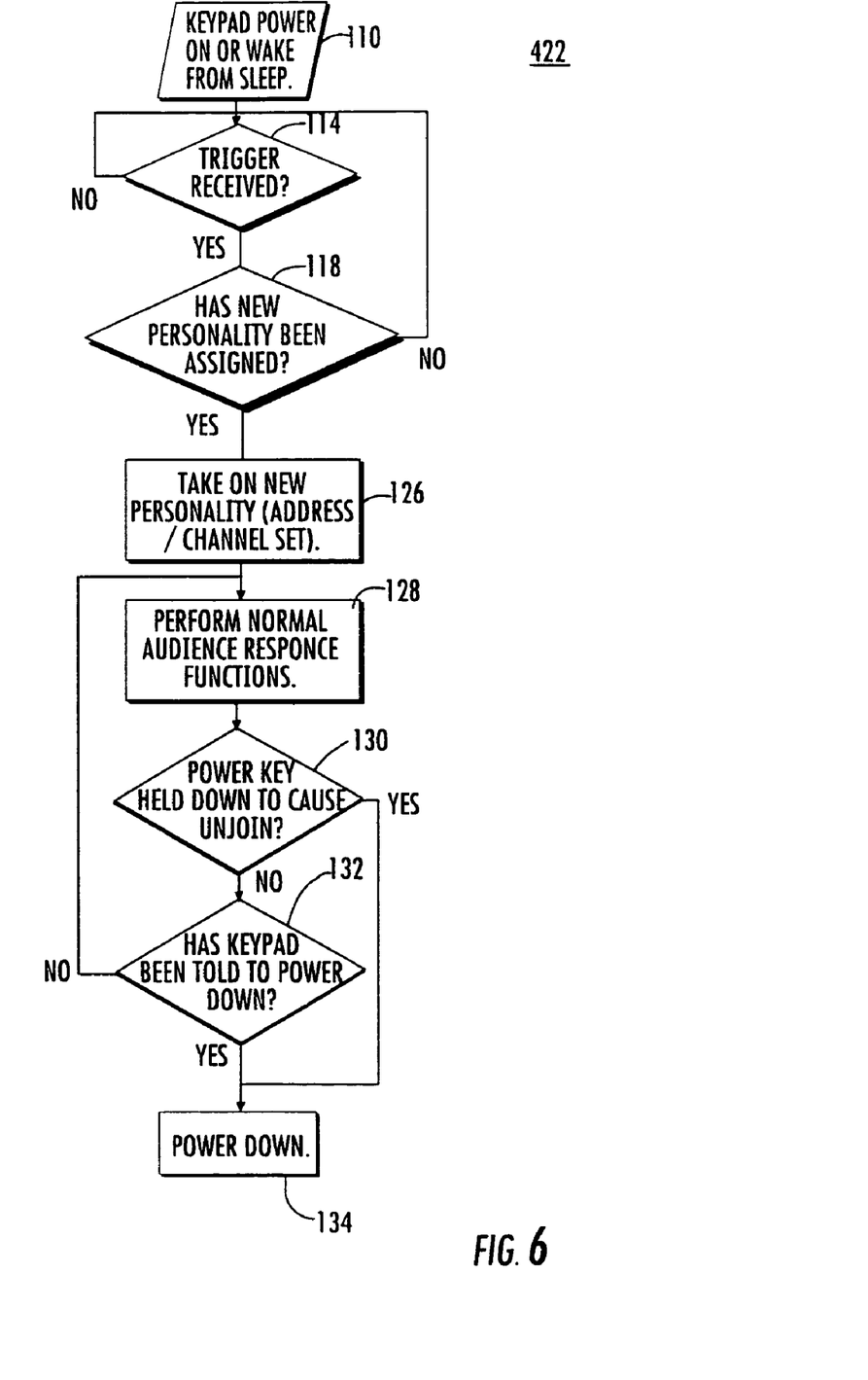
FIG. 6 is a block diagram of a method of dynamically assigning personality data using a proximity transceiver.

In a dynamic personality assignment process 422, the response unit may obtain personality data from a proximity transmitter, such as a low power transmitter, that is positioned in a manner to encounter generally one response unit at a time and having an operating range sufficiently short to only communicate with one response unit at a time. An example of such a proximity transceiver would be a transceiver positioned at a doorway at a classroom to which the students must pass. Alternatively, the proximity transceiver may be positioned at a desk at which the student may sit or a work surface at which the student works. Other examples will be apparent to the skilled artisan.

Process 422 begins at 110 with the response unit being powered on or awoken from a sleep state. It is determined at 114 whether the response unit has received some form of transmission from the proximity transmitter that dynamically provides new personality data. If so, the response unit takes on the new personality data associated with that serial number in the base packet at 126 and switches to a mode to perform normal audience response functions at 128. The response unit then waits for either a keypress power-down at 130 or, otherwise, receives a power-down signal at 132, at which time the response unit powers down at 134.

In the illustrative embodiment, the proximity transmitter may include a radio frequency identification (RFID) reader and each response unit and RFID tag which may either be an active tag or a passive tag. Alternatively, a barcode on the response unit could be read by a barcode reader. This allows the proximity transceiver to be apprised of the identity of the response unit in its proximity and to thereby send the serial number for that keypad and associated new personality data from the student schedule database to allow joining of that response unit to the base unit(s) in the adjoining classroom.

In a somewhat related embodiment, each desk or work surface in a classroom may include a tag, such as an RFID tag or barcode, that the response unit may read and takes on the personality data associated with the base unit in that room. The proximity transmitter may alternatively be connected with the base unit and forward personality data from the base unit. Alternatively, the proximity transmitter may be a nearly response unit acting as a signal repeater. Other embodiments will be apparent to the skilled artisan.

Figure 7:
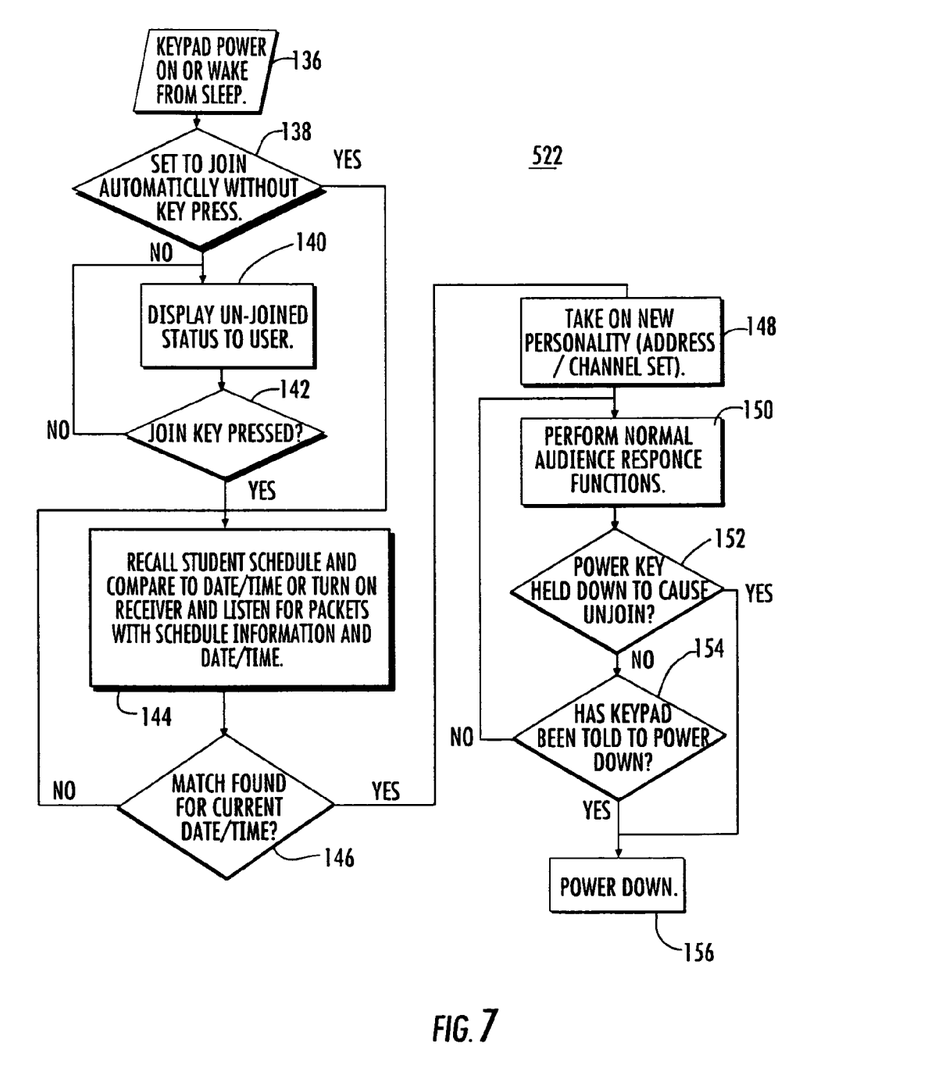
FIG. 7 is a method of dynamically assigning personality data using a database.

In an alternative dynamic personality data assignment process 522, the process is controlled directly from a database of student schedules which may be stored in memory in each response unit or may be included with a plug-in module attached to the response unit. Alternatively, the database may be running on a computer connected with the base unit(s) or may be running on a host computer/server 20 (FIG. 7).

The process begins at 136 with the response unit being powered on or waking up from a sleep state and determining at 138 whether the response unit is set to provide automatic joining of response units and base unit without a keypress. If not, an un-JOINED status is indicated by the user at 140 and the control awaits actuation of a joining at 142. If it is determined at 138 that the response system is set to allow joining automatically without a keypress, the response then examines the student schedule database stored in its memory and retrieves the schedule for the student associated with that response unit at the present time and date. Alternatively, the unit may activate its receiver at 144 and attempt to receive base packets with schedule information and date/time sent from one or more base units or other transmitter. When it is determined at 146 that a database entry has been found for the present response unit at the current date and time, the response unit takes on the associated personality data from the database at 148. The response unit then switches to a mode at 150 to perform normal audience response functions and awaits activation of a power down key at 152 or a power down signal at 154 and powers down at 156.

Figure 8:
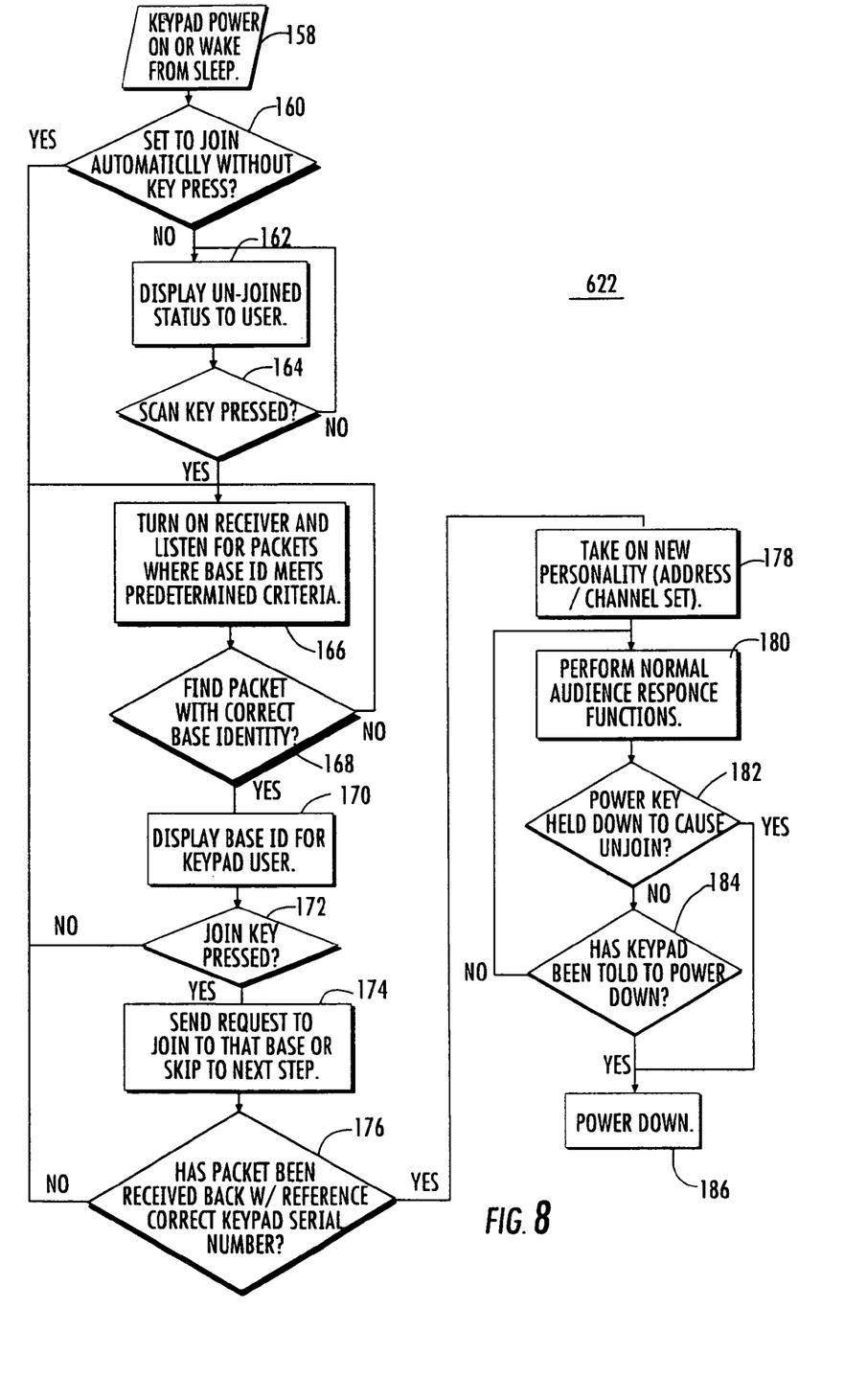
FIG. 8 is a block diagram of a method of dynamically assigning personality data using a scan key.

In a dynamic personality data assignment process 622, the user may press a SCAN key and the receiver listens for a base packet utilizing a universal ID or filter by predetermined criteria (FIG. 8). Once received, the base ID may be displayed for the user to confirm that the correct base ID was received. The user could continue to press the SCAN key until the correct base ID is found or the user could force a certain base ID using a two-digit entry similar to that used in process 122. Once the user is content with the indicated base ID, he/she can press a JOIN key, if in a manual join mode, to look for base packets directing that keypad to take on the new personality data.

Process 622 begins at 158 when the response unit powers on or awakes from a sleep state and it determines at 160 whether the response system is set to join response units and base units automatically without keypresses. If not, the response unit displays an un-JOINED status at 162 and awaits the activation of a JOIN key at 164. If it is determined at 160 that the response system is set to join automatically without a keypress, it turns on its receiver at 166 and attempts to receive base packets either on a universal base unit ID or a base ID that meets a predetermined criteria. When a base packet is found at 168 with a correct base ID, the base ID is displayed at 170 for the keypad user. As previously set forth, the user could continue to press the SCAN key until the correct base ID is found. Alternatively, the user could force a certain base ID using, by way of example, a two-digit entry method. Once the user is content with the indicated base ID, they press a JOIN key at 172, which causes the response unit to send a join request at 174 to the base unit with the indicated base ID. The response unit then awaits receipt of a join base packet from the base unit with the keypad serial number and associated new personality data. Alternatively, the user may choose what is believed to be a correct base ID and press JOIN. If it is not correct, they could press JOIN again. Once received, the response unit takes on the new personality data at 178 and performs normal audience response functions at 180 until the response unit is un-JOINED or powered down (182, 184, 186). As an alternative, the response unit may store a brief description with each base ID, such as professor, course, or room number to assist the user to select a base ID. The response unit may scan for all the base units it can receive and display a list of the descriptions. This would make it easier to scroll down to the correct class and press JOIN.

Other variations are intended to be comprehended by the claimed invention. For example, the dynamic personality data assignment process may be utilized with an asynchronous system in which communication from the response unit to the base unit is initiated by the response unit without a polling command from the base unit. While each response unit contains a factory entered serial number, the amount of data flowing over the wireless communication link may be reduced by changing this serial number to a new personality data such that the response units are organized into blocks of contiguous addresses or patterns of addresses that are organized into groups for a particular meeting. Other modifications will be apparent to the skilled artisan.

In addition to student schedule data, database 21 may include data establishing a transmission power of one or more base units 12. The power transmission level may be a function of a parameter of a space in which each such base unit is located. This allows the transmission power level to be sufficient to blanket the space but no more than is required. This reduces the amount of spill-over transmission from one room to an adjacent room or a room in an adjacent building. In addition to the base unit sending data to response units at the established transmission power level of that base unit, the response units communicating with that base unit may optionally communicate at a transmission power level set by the base unit. The power level of the response unit may be a function of the power level at which the at least one base unit is transmitting. This allows the base unit to, in turn, instruct the communicating response units to transmit at a particular power level that may be a function of the level being used by the base unit.

Changes and modifications in the specifically described embodiments can be carried out without departing from the principles of the invention. For example, each response unit may maintain in memory a list of base IDs having been used by that unit. This may facilitate a more rapid location of personality data. The list may be in reverse order with the most recently used base IDs being listed first, or the like. When a user walks in a room and turns on the response unit or presses JOIN, the response unit could look through the saved data first for a match before conducting a search based on reception. The invention is intended to be limited only by the scope of the appended claims, as interpreted according to the principles of patent law including the doctrine of equivalents.

What is claimed is:

1. A response system, comprising:
a plurality of base units;
a plurality of response units, wherein each of said response units receives a user input selection and transmits that user input selection to at least one of said base units utilizing wireless communication, wherein said response units transmit user input selections during a response interval;
wherein said at least one of said base units transmits a standard polling packet to said response units during a polling interval utilizing a standard protocol in order to retrieve user input selections from response units joined with that base unit and wherein said at least one of said base units transmits a joining packet to said response units utilizing a join protocol in order to join response units with that base unit to allow said response units to transmit user input selections to that base unit by changing personality data of response units, the personality data determining which of said base units that particular one of said response units communicate, and wherein said at least one of said base units transmits joining packets for a plurality of said response units to be joined with said one of said base units during a joining interval in order to join the plurality of response units with said one of said base units during the joining interval, said joining interval being intermingled with the response interval and the polling interval.

2. The response system of claim 1 wherein said standard protocol causes response units joined with that base unit to transmit a response.

3. The response system of claim 1 wherein said join protocol includes said at least one base unit transmitting identities of response units and personality data for use with said standard protocol.

4. The response system of claim 3 wherein a response unit responds to receipt of its personality data in said join protocol by transmitting an acknowledge message to said at least one of said base units.

5. The response system of claim 3 wherein said at least one of said base units and said response units communicates with time-division multiplex communication and wherein said personality data includes a base unit identification and a communication timeslot.

6. The response system of claim 1 wherein each of said response units communicates a user input selection with said at least one of said base units synchronously in response to a polling signal from said at least one of said base units.

7. The response system of claim 1 wherein each of said response units communicates a user input selection with said at least one of said base units asynchronously.

8. A response system, comprising:
a plurality of base units at particular spaced apart locations;
a plurality of response units;
a database correlating each of said base units with particular response units and times of day as a function of schedules of locations of the users at particular times of day, the particular response units being identified in said database by at least one chosen from users and response units, said database correlating each of said base units with different groups of particular response units at different particular times of day;
each of said response units receiving a user input selection and communicating that user input selection with at least one of said base units utilizing wireless communication;
wherein said base units communicate with said response units utilizing a standard protocol in order to retrieve user input selections from response units joined with that base unit;
wherein said base units join a response unit with said at least one of said base units by changing of personality data of that response unit utilizing a join protocol, the personality data facilitating communication with that said at least one of said base units;
wherein a particular one of said base units becomes joined with a particular group of said response units at a particular time of day and becomes joined with a different particular group of said response units at another particular time of day, the group of said response units to which said particular one of said base units is joined at a particular time of day being at least partially a function of data in said database.

9. The response system of claim 8 wherein said database resides at one chosen from i) a host computer system communicating with said base units, ii) each of said base units, and iii) each of said response units.

10. The response system of claim 8 wherein each of said response units communicates a user input selection with said at least one of said base units synchronously in response to a polling signal from said at least one of said base units.

11. The response system of claim 8 wherein each of said response units communicates a user input selection with said at least one of said base units asynchronously.

12. A method of retrieving user responses from a plurality of users, comprising:
providing a plurality of base units and a plurality of response units receiving a user input selection with each of said response units and transmitting that user input selection to at least one of said base units utilizing wireless communication during a response interval;
transmitting a standard polling packet with at least one of said base units to said response units during a polling interval utilizing a standard protocol in order to retrieve user input selections from response units joined with that base unit and transmitting a joining packet to said response units with said at least one of said units utilizing a join protocol in order to join response units with that base unit to allow said response units to transmit user input selections to that base unit by providing personality data for said response units, the personality data facilitating communication with a particular one of said base units;
changing personality data of a particular one of said response units in order to change which of said base units that particular one of said response unit communicates; and
said changing personality data including transmitting joining packets including personality data for a plurality of said response units to be joined with said one of said base units during a joining interval in order to join the plurality of said response units with said one of said base units during the joining interval, the joining interval being intermingled with the response interval and the polling interval.

13. The method of claim 12 including utilizing said standard protocol intermingled with said join protocol in order to join response units with that base unit intermingled with retrieving user input selections from response units joined with that base unit.

14. The response system of claim 1 wherein said at least one of said base units communicates utilizing said standard protocol intermingled with said join protocol in order to join response units intermingled with retrieving user input selections from response units joined with that base unit.

15. The response system of claim 8 wherein said particular one of said base units joins response units intermingled with retrieving user input selections from response units joined with that base unit.

16. A method of retrieving user responses from a plurality of users, comprising:
  providing a plurality of base units at particular spaced apart locations and a plurality of response units;
  providing a plurality of response units and communicating between said response units and at least one of said base units utilizing wireless communication;
  providing personality data for said response units, said personality data facilitating communication with a particular one of said base units; and
  providing a database correlating each of said base units with particular response units and times of day as a function of schedules of locations of users at particular times of day, the particular response units being identified in said database by at least one chosen from users and response units and correlating each of said base units with different groups of particular response units at different particular times of day with said database;
  receiving a user input selection with one of said response units and communicating that user input selection with at least one of said base units to which that response unit is joined utilizing a standard protocol;
  joining a response unit with one of said base units utilizing a join protocol by changing of personality data of that response unit, the personality data facilitating communication with that base unit; and
  joining a particular one of said base units with a particular group of said response units at a particular time of day and joining that particular one of said base units with a different particular group of said response units at another particular time of day by changing the personality data for the response units, the group of said response units to which said particular one of said base units is joined at a particular time of day being at least partially a function of data in said database.

17. The method of claim 16 including joining response units intermingled with retrieving user input selections from response units joined with said particular one of said base units.

18. The response system of claim 8 wherein said plurality of base units are distributed in different geographic locations.

19. The method of claim 16 including providing said plurality of base units distributed in different geographic locations.

20. The method of claim 17 wherein said joining includes communicating with said standard protocol and said join protocol according to a particular proportion, wherein said proportion changes with time.

21. The response system of claim 15 wherein said particular one of said base units communicates with said standard protocol and said join protocol according to a particular proportion, wherein said proportion changes over time.

22. A response system, comprising:
  a plurality of base units;
  a plurality of response units, wherein each of said response units receives a user input selection and transmits that user input selection to at least one of said base units utilizing wireless communication, wherein said response units transmit user input selections during a response interval;
  wherein said at least one of said base units transmits a standard polling packet to said response units during a polling interval utilizing a standard protocol in order to retrieve user input selections from response units joined with that base unit and wherein said at least one base unit transmits a joining packet to said response units utilizing a join protocol in order to join response units with that base unit to allow said response units to transmit user input selections to that base unit by changing personality data of response units, the personality data determining which of said base units that particular one of said response units communicates; and
  wherein said at least one of said base units changes personality data of response units by transmitting joining packets for a plurality of response units to be joined with said at least one of said base units to response units without those response units needing to request to be joined with said at least one of said base units, wherein the joining packets comprise serial numbers of response units to be joined and personality data associated with the serial numbers.

23. The response system of claim 22 wherein the personality data comprises a communication channel or base association value of the one of the base units to which the response unit is to be joined.

24. A response system, comprising:
  a plurality of base units at particular spaced apart locations;
  a plurality of response units, each of said response units receiving a user input selection and communicating that user input selection with at least one of said base units utilizing wireless communication;
  wherein said at least one of said base units communicates with said response units utilizing a standard protocol in order to retrieve user input selections from response units joined with that base unit and wherein said at least one base unit communicates with said response units utilizing a join protocol in order to join response units with that base unit by changing personality data of response units, the personality data determining which of said base units that particular one of said response units communicates;
  wherein said at least one of said base units change personality data of response units by communicating personality data to response units without those response units needing to request to be joined with said at least one of said base units; and
  a database correlating each of said base units with particular response units and times of day as a function of schedules of locations of the users at particular times of day, the particular response units being identified in said database by at least one chosen from users and response units, said database correlating each of said base units with different groups of particular response units at different particular times of day, wherein a particular one of said base units becomes joined with a particular group of said response units at a particular time of day and becomes joined with a different particular group of said response units at another particular time of day, the group of said response units to which said particular one of said base units is joined at a particular time of day being at least partially a function of data in said database.

25. The response system of claim 24 wherein said at least one of said base units joins response units intermingled with retrieving user input selections from response units joined with that base unit.

26. The response system of claim 25 wherein said particular one of said base units communicates with said standard protocol and said join protocol according to a particular proportion, wherein said proportion changes over time.

27. A method of retrieving user responses from a plurality of users, comprising:
providing a plurality of base units and a plurality of response units receiving a user input selection with each of said response units and transmitting that user input selection to at least one of said base units utilizing wireless communication;
transmits a standard polling packet with at least one of said base units to said response units during a polling interval utilizing a standard protocol in order to retrieve user input selections from response units joined with that base unit and transmitting a joining packet with said at least one of said units to said response units utilizing a join protocol in order to join response units with that base unit to allow said response units to transmit user input selections to that base unit by providing personality data for said response units, the personality data facilitating communication with a particular one of said base units;
changing personality data of a particular one of said response units in order to change which of said base units that particular one of said response unit communicates;
wherein said changing the personality data of a particular one of said response units includes said at least one of said base units transmitting joining packets for a plurality of response units to be joined with said at least one of said base units to response units without those response units needing to request to be joined with said at least one of said base units, wherein the joining packets comprise serial numbers of response units to be joined and the personality data associated with the serial numbers.

28. The method of claim 27 wherein the personality data comprises a communication channel or base association value of the one of the base units to which the response unit is to be joined.

29. A method of retrieving user responses from a plurality of users, comprising:
providing a plurality of base units at particular spaced apart locations and a plurality of response units, each of said response units receiving a user input selection and communicating that user input selection with at least one of said base units utilizing wireless communication;
at least one of said base units communicating with said response units utilizing a standard protocol in order to retrieve user input selections from response units joined with that base unit and said at least one of said units communicating with said response units utilizing a join protocol in order to join response units with that base unit by providing personality data for said response units, the personality data facilitating communication with a particular one of said base units;
changing personality data of a particular one of said response units in order to change which of said base units that particular one of said response unit communicates;
said at least one of said base units changing the personality data of response units by communicating personality data to response units without those response units needing to request to be joined with said at least one of said base units;
providing a database correlating each of said base units with particular response units and times of day as a function of schedules of locations of users at particular times of day, the particular response units being identified in said database by at least one chosen from users and response units and correlating each of said base units with different groups of particular response units at different particular times of day with said database; and
joining a particular one of said base units with a particular group of said response units at a particular time of day and joining that particular one of said base units with a different particular group of said response units at another particular time of day by changing the personality data for the response units, the group of said response units to which said particular one of said base units is joined at a particular time of day being at least partially a function of data in said database.

30. The method of claim 29 including joining response units intermingled with retrieving user input selections from response units joined with said particular one of said base units.

31. The method of claim 30 wherein said joining includes communicating with said standard protocol and said join protocol according to a particular proportion, wherein said proportion changes with time.

32. The response system of claim 1 wherein a length of the joining interval changes over time as additional ones of said response units become joined with said at least one of said base units.

33. The response system of claim 32 wherein the length of the joining interval decreases over time.

34. The method of claim 12 wherein a length of the joining interval changes over time as additional ones of said response units become joined with said at least one of said base units.

35. The method of claim 34 wherein the length of the joining interval decreases over time.

* * * * *